US011904361B2

(12) United States Patent
Aigner et al.

(10) Patent No.: US 11,904,361 B2
(45) Date of Patent: Feb. 20, 2024

(54) SCREEN PLATE FOR A SEPARATING DEVICE FOR CLASSIFYING BULK MATERIAL

(71) Applicant: WACKER CHEMIE AG, Munich (DE)

(72) Inventors: Thomas Aigner, Töging (DE); Franz Bergmann, Mehring (DE); Andreas Schneider, Mühldorf (DE); Jonas Killermann, Ampfing (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 18/022,528

(22) PCT Filed: Aug. 24, 2020

(86) PCT No.: PCT/EP2020/073597
§ 371 (c)(1),
(2) Date: Feb. 22, 2023

(87) PCT Pub. No.: WO2022/042815
PCT Pub. Date: Mar. 3, 2022

(65) Prior Publication Data
US 2023/0311165 A1 Oct. 5, 2023

(51) Int. Cl.
*B07B 1/46* (2006.01)
*B07B 13/07* (2006.01)

(52) U.S. Cl.
CPC ............ *B07B 1/4654* (2013.01); *B07B 13/07* (2013.01)

(58) Field of Classification Search
CPC ... B07B 1/4654; B07B 1/4672; B07B 1/4681; B07B 1/469; B07B 1/46; B07B 1/4609; B07B 1/00; B07B 1/12; B07B 1/4636; B07B 1/4645; B07B 13/07; B07B 13/04
USPC ................ 209/233, 363, 405, 158, 315, 412
See application file for complete search history.

(56) References Cited

U.S. PATENT DOCUMENTS

| | | | | |
|---|---|---|---|---|
| 6,360,895 | B1 * | 3/2002 | Riggenmann | B07B 1/12 209/379 |
| 2018/0185882 | A1 * | 7/2018 | Bergmann | B07B 13/07 |

FOREIGN PATENT DOCUMENTS

| | | | | |
|---|---|---|---|---|
| CN | 1302237 A | 7/2001 | | |
| CN | 207605973 U | 7/2018 | | |
| DE | 102016225248 A1 | 6/2018 | | |
| EP | 1079939 A1 | 3/2001 | | |
| EP | 2730510 A1 | 5/2014 | | |
| JP | 6588937 B2 | 10/2019 | | |
| WO | 9726495 A2 | 7/1997 | | |
| WO | WO-9726495 A2 | * | 7/1997 | B07B 1/12 |
| WO | 0121329 A1 | 3/2001 | | |
| WO | WO-0121329 A1 | * | 3/2001 | B07B 1/12 |
| WO | 2016202473 A1 | 12/2016 | | |
| WO | 2018108334 A1 | 6/2018 | | |
| WO | WO-2018108334 A1 | * | 6/2018 | B07B 1/4654 |

* cited by examiner

*Primary Examiner* — Gene O Crawford
*Assistant Examiner* — Muhammad Awais

(57) ABSTRACT

A screen plate for a separating device for classifying bulk material along with separating device having at least one screen plate therein classifying bulk material.

15 Claims, 6 Drawing Sheets

SCREEN PLATE FOR A SEPARATING DEVICE FOR CLASSIFYING BULK MATERIAL

CROSS-REFERENCE TO RELATED APPLICATIONS

This application is a U.S. National Phase application of PCT Application NO. PCT/EP2020/073597 filed on Aug. 24, 2020, which is incorporated by reference herein in its entirety.

Subject-matter of the invention is a screen plate for a separating device for mechanically classifying bulk material, more particularly polycrystalline silicon chunk.

Polycrystalline silicon (polysilicon) is produced typically by the Siemens process—a chemical vapor deposition process. In a bell-shaped reactor (Siemens reactor), thin filament rods (thin rods) of silicon are heated by direct passage of current, and a reaction gas comprising a silicon-containing component (e.g., monosilane or halosilane) and hydrogen is introduced. The surface temperature of the filament rods is typically more than 1000° C. At these temperatures, the silicon-containing component of the reaction gas is decomposed, and elemental silicon deposits from the gas phase in the form of polysilicon on the rod surface, increasing the rod diameter. When a mandated diameter has been reached, deposition is halted and the silicon rods obtained are uninstalled.

Polysilicon is the starting material in the production of monocrystalline silicon, which is produced for example by means of Czochralski process (crucible pulling). Additionally, polysilicon is needed for the production of multicrystalline silicon, using a block casting process, for example. Both processes require the polysilicon rods to be crushed to form individual chunks. These chunks are classified by size, typically in separating devices. The separating devices generally comprise screening machines which sort the polysilicon chunk mechanically into different size classes—that is, they classify it.

Polysilicon may additionally be produced in the form of granules in a fluidized bed reactor. This is accomplished by fluidization of silicon seed particles using a gas flow in a fluidized bed, which is heated using a heating device. The addition of a silicon-containing reaction gas brings about a deposition reaction on the hot particle surface, with elemental silicon being deposited on the seed particles and an increase in the diameter.

The polysilicon granules as well are typically divided by a screening unit into two or more fractions (classifying). The smallest fraction (screen undersize) may subsequently be processed into seed particles in a milling unit, and supplied to the reactor. The target fraction (product fraction) is typically packed and transported to the customer.

Screening machines serve generally to separate solids according to particle size. A distinction may be made in terms of motion characteristics between planar vibratory screening machines and shaker screening machines. The screening machines are usually driven electromagnetically or by means of imbalance motors or imbalance gearing. The motion of the screen tray conveys the charge material in the screen longitudinal direction and facilitates passage of the screening undersize through the screen openings. In contrast to planar vibratory screening machines, shaker screening machines feature vertical as well as horizontal screen acceleration.

Multideck screening machines are able to fractionate a number of particle sizes at the same time. The drive principle for multideck planar screening machines is based on two imbalance motors which operate in opposite directions to generate a linear vibration, with the fractionation material moving linearly over a horizontal separation surface. A m modular system may be used to assembly a multiplicity of screen decks into a screen stack. It is possible accordingly to produce different particle sizes in a single machine without any need to change screen decks.

Classification is typically accomplished using, alternatively, perforated screens, bar screens or profile screen plates with elevations and valleys and possibly V-shaped openings on one side.

Classification using perforated screens, of the kind described in CN207605973U, for example, are subject to possible blocking during operation, and, depending on the size of the charged material and the throughput, any blockages must be removed at regular intervals, leading to plant and production downtime. In the case of classification using bar screens (cf. EP 2 730 510 A1), the geometrical arrangement of the bars may result in blocking and clogging of fractionation material, with the possible consequence of losses in yield when the target product is separated off.

WO 2016/202473 A1 describes a profiled screen plate having a V-shaped profile, which has enlarging openings on a takeoff side. The valleys and peaks, which taper to a point, may however give rise to blocking of product fraction (blocked bulk material may also be referred to as stuck particles) in the product flow and in the opening region. This may lead to a deterioration in the classified material, since the undersize fraction, to be separated off, passes via the stuck fraction into the target fraction. To prevent this, it is again necessary to remove the stuck fraction regularly, resulting in longer downtime.

WO 2018/108334 A1 represents an improvement to the screen plate described in WO 2016/202473 A1. In this case the openings on the takeoff side have additional widening. The screen plate, however, is fairly poor at separating coarse/product fraction and fine fraction (precision of separation). As a result of the screen geometry, large particles may push the undersize in front of them and prevent the undersize being separated off.

The object to be achieved by the invention arose from the above-described problems.

The object is achieved by means of a screen plate for a separating device for classifying bulk material, comprising a profile region which has a profile having depressions and elevations extending in the direction of a takeoff side, where the profile is describable by a circle arc of a first circle K1 and by a circle arc of the second circle K2, and the circles K1 and K2 are disposed adjacent to one another, (and can be juxtaposed in alternation as often as desired) where the circle arc of the first circle K1 with a radius r1 describes the elevations and the circle arc of the second circle K2 with a radius r2 describes the depressions, with each depression in a takeoff region undergoing transition into an opening which expands in the direction of the takeoff side, where the opening has an opening edge with a width corresponding to the length of the radius r2 to 2*r2. The width preferably corresponds to the radius r2.

It has emerged that this rounded profile allows the undersize fraction (fines to be separated off) even more effectively to separate from the product fraction. As a result of the profiled region, larger amounts of the undersize fraction collect in the rounded depressions. Larger chunks are transported over the undersize fraction on the screen plate into the depressions, generally without coming into contact with the undersize fraction. This results in a high quality of separation. The profile prevents larger chunks remaining stuck in the depressions by jamming. In particular, the broadened opening edge also on the one hand prevents the jamming of large chunks, and on the other hand ensures unhindered separation of the undersize fraction if a larger chunk becomes jammed.

The screen plate of the invention is more particularly an onward development of the screen plate described in WO 2018/108334 A1.

The circles K1 and K2 may contact one another at a point T0, or are joined to one another by a common tangent, with the tangent touching the circle K1 at the point T1 and the circle K2 at a point T2. Correspondingly, the profile is described by the tangent, optionally with the circle arcs. The circles K1 and K2 are preferably disposed adjacent to one another with the proviso that the depressions and the profile always expand upwardly (cf. FIG. 2B). The circle arc of the circle K1 which describes the elevations of the profile extends from the apex of the elevation to the point T0 or T1. The circle arc of the circle K2 describing the depressions of the profile extends from the apex of the depression to the point T0 or T2.

The two circles K1 and K2 may in principle be joined to one another by a higher-order function, a hyperbole or an ellipse arch as well, albeit with the proviso that the depressions of the profile always expand upwardly.

The bulk material may comprise polysilicon chunk material, such as comminuted polysilicon rods from the Siemens process. The bulk material may also comprise polysilicon granules. The bulk material is applied to the screen plate generally in a charging region, which is opposite the takeoff region.

The opening edge has a concave extent, thus arching into the interior of the screen plate or in the direction of the feed region, and has a depth t, with t being subject to $0<t\leq 5*r2$, preferably r2 to 5*r2, more preferably r2 to 4*r2, more particularly 2*r2 to 3*r2. (cf. FIG. 4A).

According to another embodiment, the opening edge has a rectangular extent and has a depth t, with t being subject to $0<t\leq 5*r2$, preferably r2 to 5*r2, more preferably r2 to 4*r2, more particularly 2*r2 to 3*r2. (cf. FIG. 4B).

For removal of bulk material of small particle size (also referred to as undersize), the profile of the screen plate may preferably have the two configurations described below. Bulk material of small particle size is intended here to refer to a portion of the charged amount of bulk material that is to be separated off by means of the screen plate. The bulk material of small particle size hence corresponds to the fraction to be separated off.

The profile of the screen plate for removing undersize is preferably subject to $r2<r1$, where $0<r2/r1<1$, preferably $0.2<r2/r1<0.4$. Furthermore, $r1+r2=e$, where e corresponds to the distance between the circle center point M1 of K1 and the circle center point M2 of K2, and where the circles K1 and K2 contact one another at a point T0, at which the circle arcs described in the profile merge.

Furthermore, $0°<\alpha<65°$, preferably $0°<\alpha<25°$, more preferably $5°<\alpha<20°$, where $\alpha$ is an angle which defines the position of M2 relative to M1 in a cartesian coordinate system, if M1 and M2 are vertices of a right-angled triangle and e corresponds to the hypotenuse of the triangle (cf. FIG. 5).

According to a further embodiment for the removal of undersize, the screen plate is subject to $r2<r1$, where $0<r2/r1<1$, preferably $0.2<r2/r1<0.4$. Additionally, $r1+r2>e$, where e is the distance between the circle center point M1 of K1 and M2 of K2, and the circles K1 and K2 do not contact one another.

Additionally, $-65°<\alpha<65°$, preferably $-25°<\alpha<10°$, more preferably $-10°<\alpha<5°$, where $\alpha$ is an angle which defines the position of M2 relative to M1 in a cartesian coordinate system, if M1 and M2 are vertices of a right-angled triangle and e corresponds to the hypotenuse of the triangle, where the circle arc (or the circles K1 and K2) are joined to one another by a joint tangent through the points T1 of K1 and T2 of K2 (cf. FIG. 6).

For the removal of bulk material of large particle size (also referred to as oversize), the profile of the screen plate may preferably have the two configurations described below. Bulk material of large particle size is intended here to refer to a portion of the charged amount of bulk material that is to be separated off by means of the screen plate. The bulk material of large particle size therefore corresponds to the fraction to be separated off. Oversize may lead to clogging of individual depressions or to damage to the screen plate.

The profile of the screen plate for removing oversize is preferably subject to $r2>r1$, where $0<r1/r2<1$, preferably $0.2<r1/r2<0.4$.

Additionally, $r1+r2=e$, where e corresponds to the distance between the circle center point M1 of K1 and the circle center point M2 of K2, and K1 and K2 contact one another at a point T0 at which the circle arcs merge. Furthermore, $-65°<\alpha<0°$, preferably $-20°<\alpha<0°$, where $\alpha$ is an angle which defines the position of M2 relative to M1 in a cartesian coordinate system, if M1 and M2 are vertices of a right-angled triangle and e corresponds to the hypotenuse of the triangle (cf. FIG. 7).

According to a further embodiment for removing oversize, the screen plate is subject to $r2>r1$, where $0<r1/r2<1$, preferably $0.2<r1/r2<0.4$.

Additionally, $r1+r2>e$, where e corresponds to the distance between the circle point M1 of K1 and the circle center point M2 of K2, and the circles K1 and K2 do not contact one another. Furthermore, $-65°<\alpha<65°$, preferably $-20°<\alpha<0°$, where $\alpha$ is an angle which defines the position of M2 relative to M1 in a cartesian coordinate system, if M1 and M2 are vertices of a right-angled triangle and e corresponds to the hypotenuse of the triangle, with the circle arcs being joined to one another by a common tangent through the points T1 of K1 and T2 of K2 (cf. FIG. 8).

The screen plate is preferably made of a material selected from the group of plastic, ceramic, glass, diamond, amorphous carbon, silicon, metal, and combinations thereof.

The screen plate, or at least the part of the screen plate that comes into contact with the bulk material, may be lined or coated with a material selected from the group of plastic, ceramic, glass, diamond, amorphous carbon, silicon, and combinations thereof.

More particularly the screen plate may have a coating of titanium nitride, titanium carbide, silicon nitride, silicon carbide, aluminum titanium nitride or DLC (diamondlike carbon).

The plastic may be for example PVC (polyvinyl chloride), PP (polypropylene), PE (polyethylene), PU (polyurethane), PFA (perfluoroalkyl polymer), PVDF (polyvinylidene fluoride), and PTFE (polytetrafluoroethylene).

The screen plate preferably consists of a cemented carbide.

A further aspect of the invention concerns a separating device for classifying bulk material, comprising at least one of the screen plates described, and at least one separating element disposed beneath the takeoff region of the screen plate and having a separating edge.

The length of the separating element preferably corresponds to the length of the takeoff side of the screen plate. The distance of the separating element from the takeoff region is preferably variable.

The purpose of the separating element is to separate undersize or oversize from the target fraction. The separating element is preferably static and does not vibrate with the screen plate.

The separating element preferably has a triangular side profile, more particularly the side profile of an acute-angled triangle.

The separating edge of the separating element preferably has the same profile as the screen plate. The separating edge may also have a straight-line configuration, so that when viewed straight on the separating element has the contour of a rectangle.

The separating element is preferably swivelable by an angle δ. At relatively high transport speeds in particular, this may be an advantage, since in that case there is a greater difference in the drop curves of large and small chunks, and the fine fraction can be separated off more effectively with a swiveled separating edge. As a result of the swivel, there are far fewer chunks which rebound from the separating element and possibly enter the target product.

Figure 10:
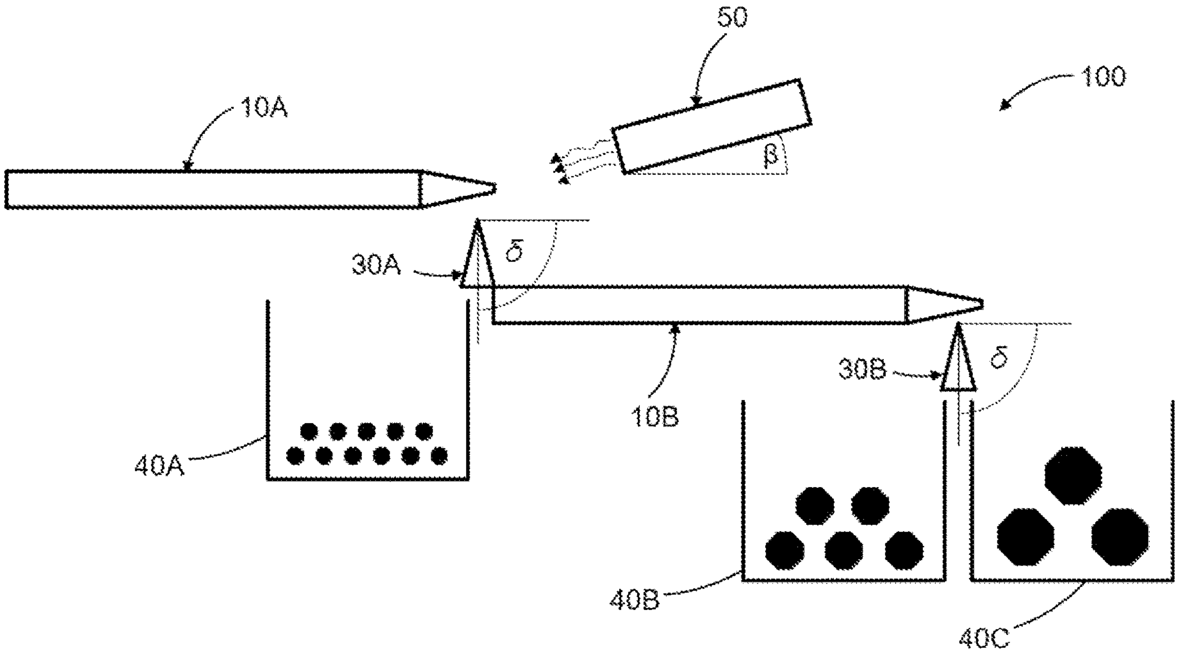
Figure 11:
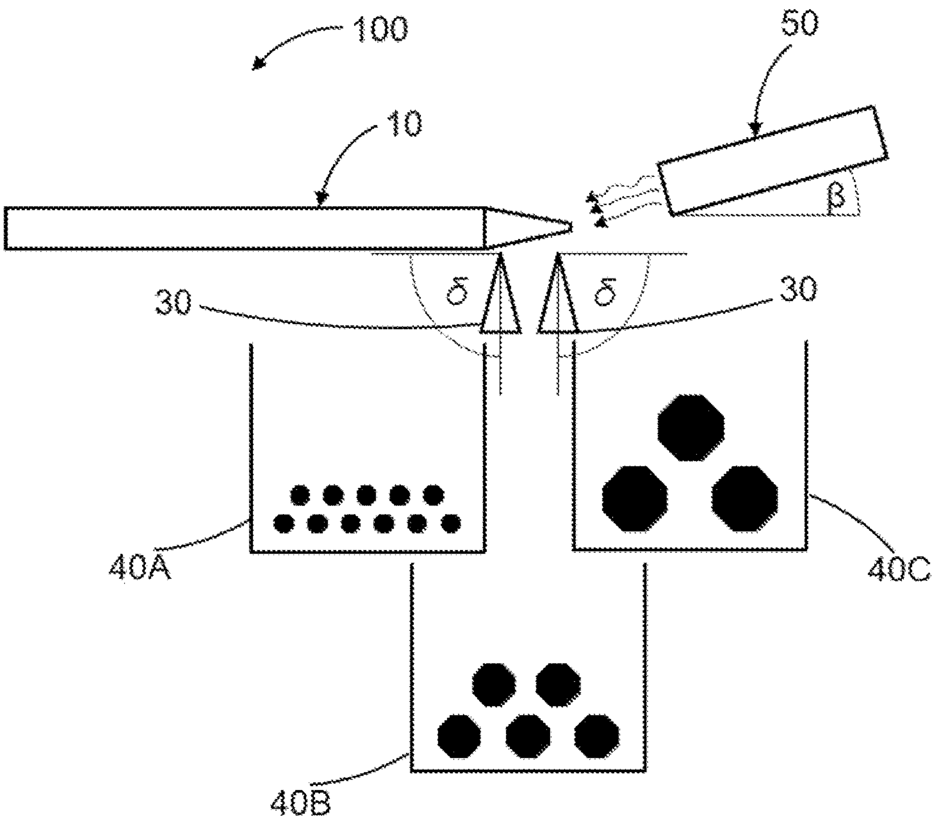
Figure 12:
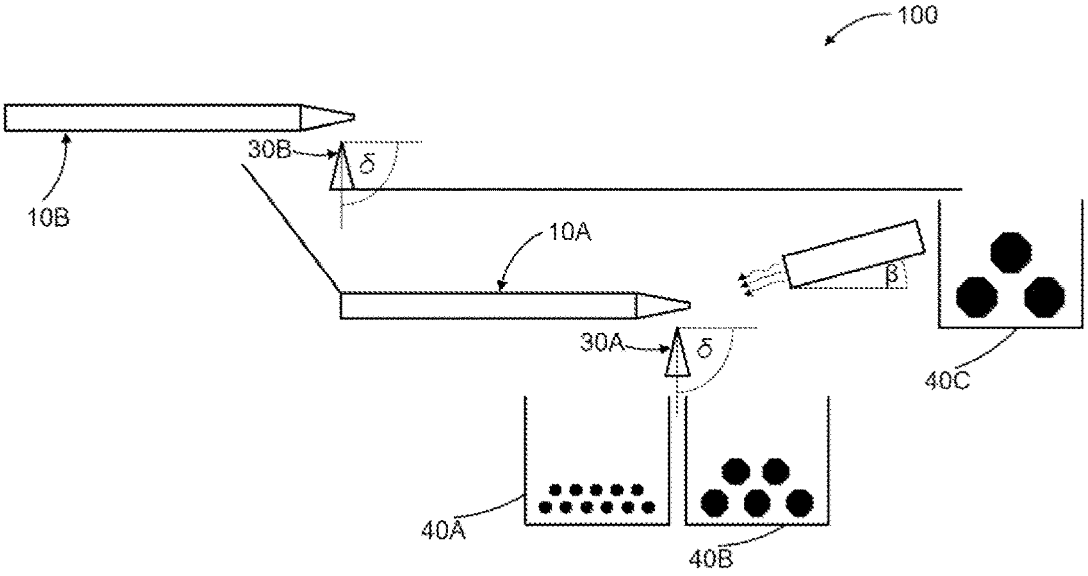

FIGS. 10, 11 and 12 each show a further embodiment of the separating device.

LIST OF REFERENCE NUMERALS USED

Figure 1:
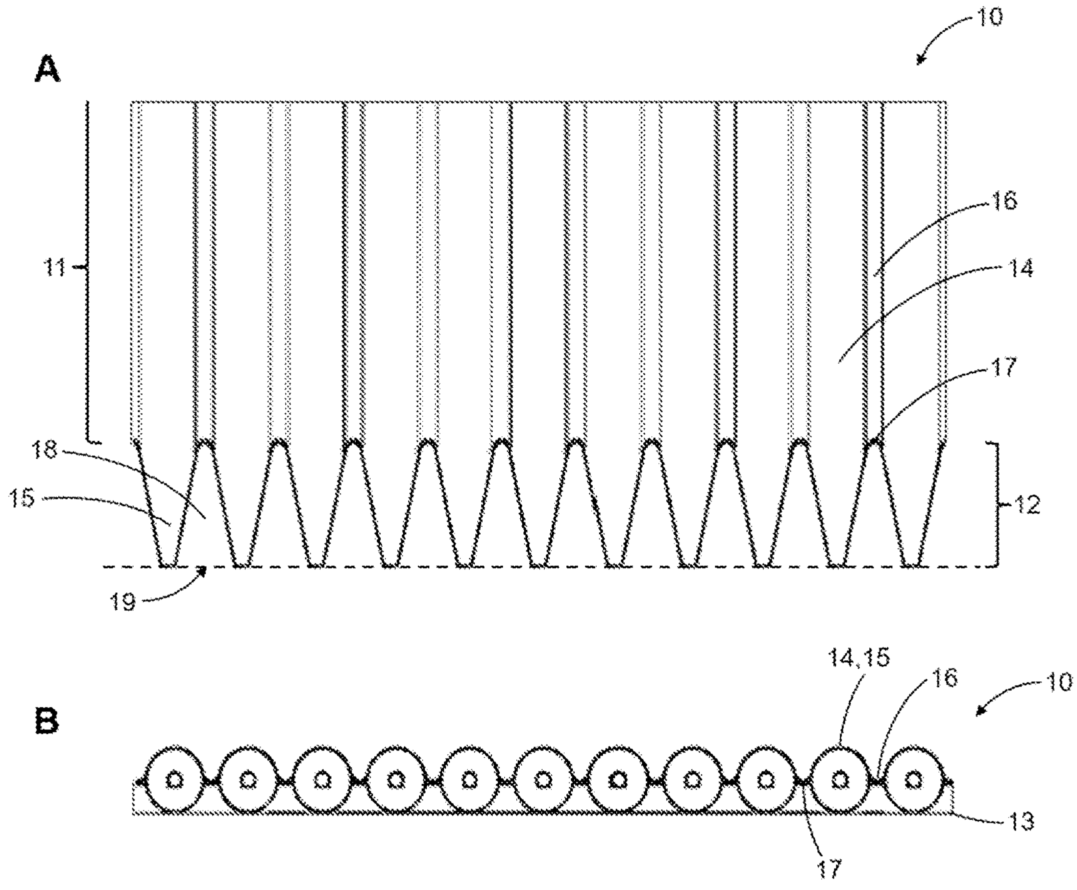
FIG. 1 shows a screen plate of the invention in plan view and straight-on view.

- 10 Screen plate
- 11 Profile region
- 12 Takeoff region
- 13 Mount
- 14 Elevation
- 15 Projection
- 16 Depression
- 17 Opening edge
- 18 Opening
- 19 Takeoff side
- 20 Charging region
- 30 Separating element
- 32 Separating edge
- 40 Collecting container
- 41 Collecting container
- 42 Collecting container
- 50 Blower
- 100 Separating device FIG. 1A depicts a detail of a screen plate 10 of the invention, with a profile region 11 and a takeoff region 12. The profile region 11 has elevations 14 and depressions 16 in alternation. The depressions 16 in the takeoff region 12 transition into openings 18, through which the bulk material can fall as a function of its size. The transition between depression 16 and opening 18 is formed by an opening edge 17, which is described more precisely using FIGS. 3 and 4. The openings 18 expand in the direction of a takeoff side 19 (dashed line). The profiling is fundamentally retained in the takeoff region 12, with the openings 18 preferably being milled or punched into a profile region. The projections 15 which are formed in this way are correspondingly arched and form a continuation of the elevations 14. The takeoff region 12 is situated fundamentally between the opening edges 17 and the takeoff side 19. It may possibly be preferable for the opening edges 17 not to be situated at the same height.

FIG. 1B shows a straight-on view of the screen plate 10. In this perspective there is no apparent difference between the takeoff region 12 and the profile region 11. The screen plate is disposed in a mount 13, with the mount 13 extending at most to the opening edges 17.

Figure 2:
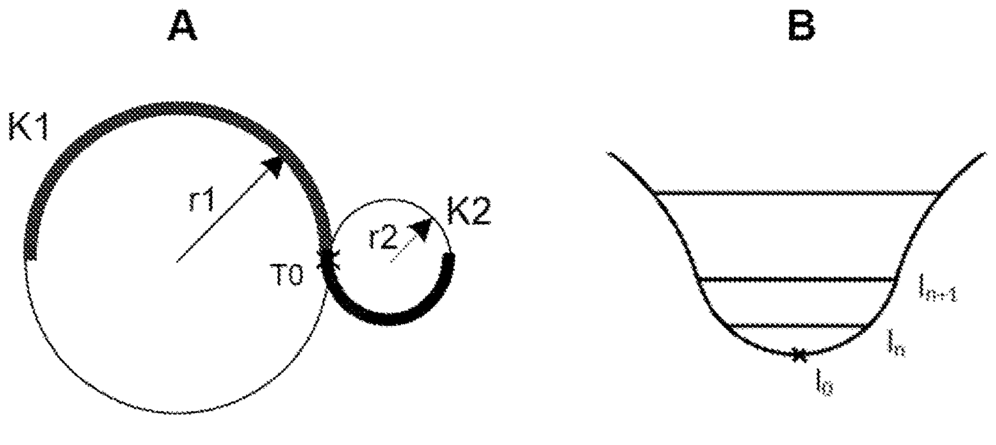
FIG. 2 illustrates the description of the profile of the screen plate.

FIG. 2A shows how the profile of the screen plate 10 (cf. FIG. 1) can be described by means of two adjacently disposed circles K1 and K2 which contact one another at a point T0. The elevations 14 are described by a circle arc—depicted in bold—of the circle K1 having the radius r1. The depressions 16 are described by a circle arc—depicted in bold—of the circle K2 having the radius r2, and the circle arcs merge at the contact point T0. Disposed repeatedly and alternatingly adjacent to one another, the result is the profile of the screen plate 10. More particularly, K1 and K2 are disposed adjacent to one another in such a way that the depressions 16 always expand. This expansion is depicted illustratively in FIG. 2B. The depressions 16 are preferably to be subject to $I_0 < I_n < I_{+n}$.

Figure 3:
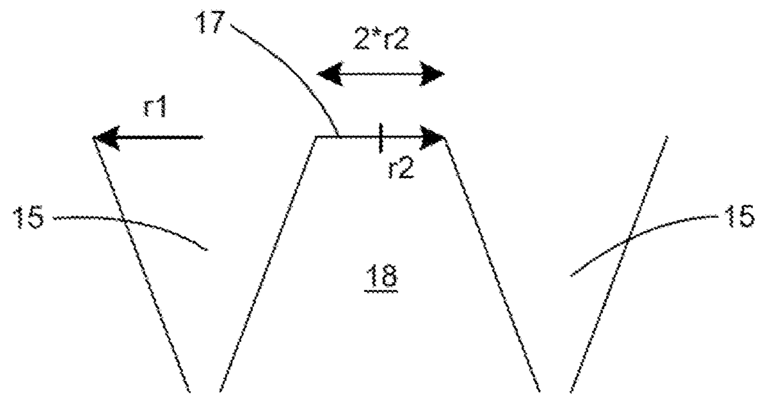
FIG. 3 illustrates the description of the opening edge of the screen plate.

FIG. 3 shows a detail view of the opening edge 17 in plan view. In this illustrative embodiment, the opening edge 17 has a width which corresponds to twice the radius r2 of the circle K2 (cf. FIG. 2). Likewise depicted is the radius r1 of the circle K1.

Figure 4:
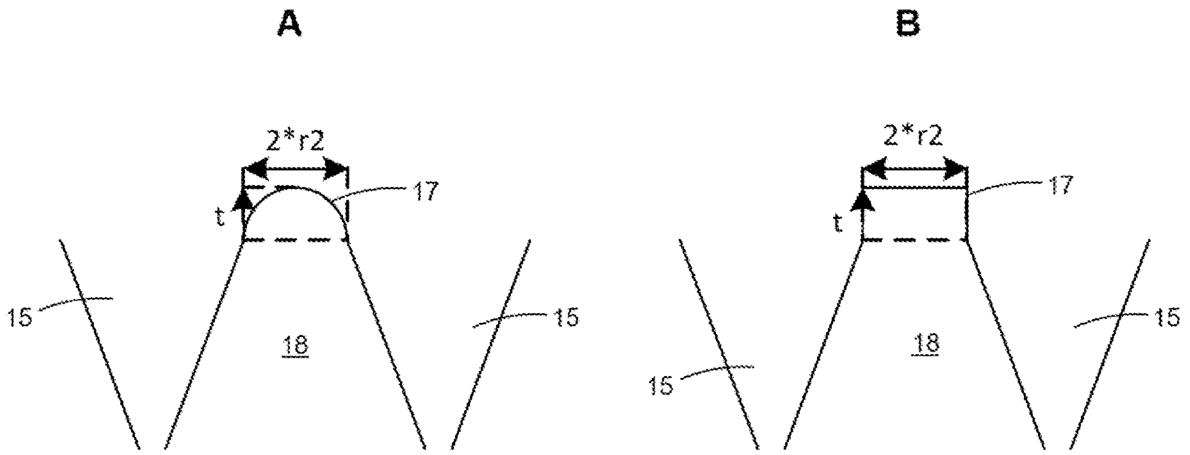
FIG. 4 shows two embodiments of the screen plate in the region of the opening edge.

FIG. 4 shows two configurations of the screen plate 10, with FIG. 4A depicting an embodiment with a concave opening edge 17, and FIG. 4B depicting an embodiment with a rectangularly extending opening edge 17. Possible typical values for r1, r2 and the depth t are as follows: r1=15 mm, r2=5 mm, t=5 mm.

Figure 5:
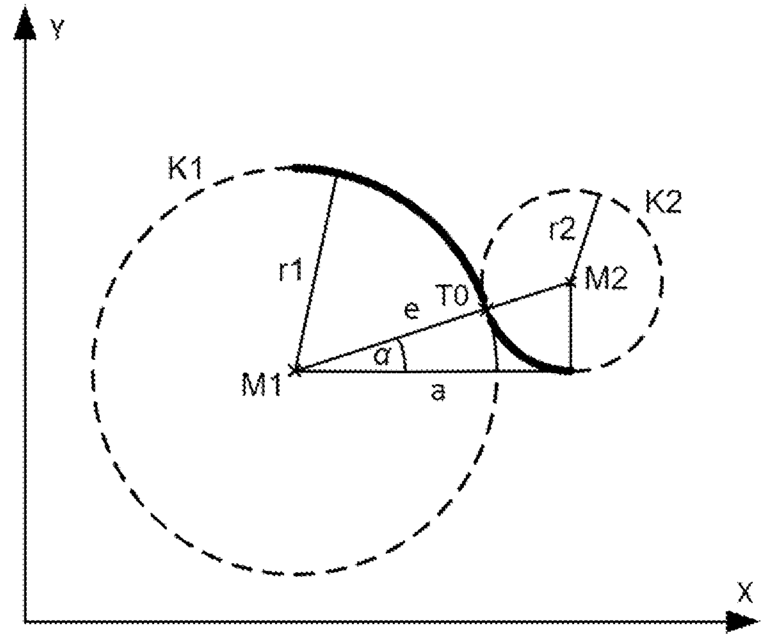
FIG. 5 shows a profile for the removal of undersize.

FIG. 5 illustrates a screen plate profile 10 which is suitable in particular for the removal of bulk material of small particle size (undersize). The position of the circles K1 and K2 relative to one another, these circles contacting one another at a point T0, may be described by a right-angled triangle, with the hypotenuse being the connecting line e between the circle center points M1 and M2, and the adjacent side a extending parallel to the x-axis of a cartesian coordinate system. The angle α (to the opposite side), along with the proviso that the radius of K1 is greater than that of K2, authoritatively determines the profile of the screen plate 10. In this case a is around 30°, thereby producing the profile indicated in the form of the bold line.

Figure 6:
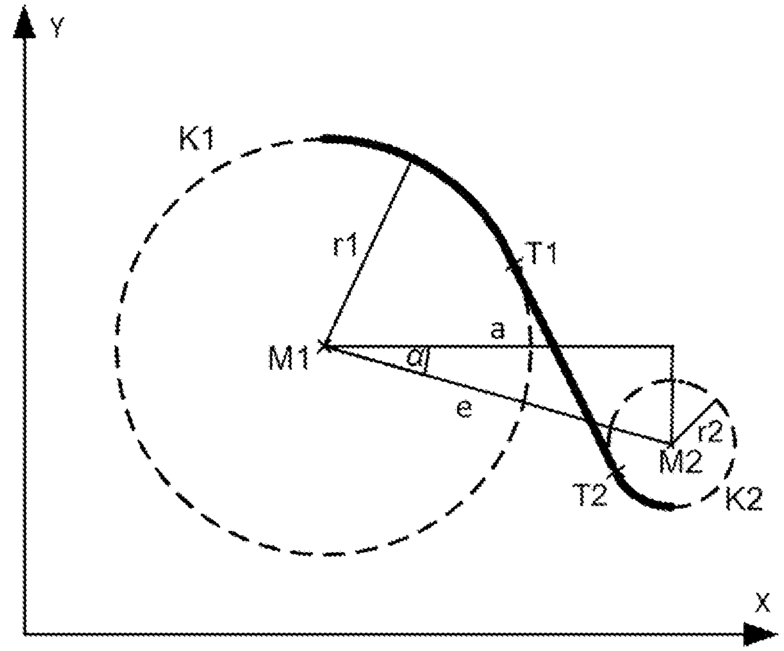
FIG. 6 shows a further profile for the removal of undersize.

FIG. 6 shows the profile of a screen plate 10 which is likewise particularly suitable for removing undersize. In contrast to the profile depicted in FIGS. 5, K1 and K2 do not contact one another, instead being joined via a common tangent through the points T1 and T2. The angle α in this case is around 25°. Possible typical values of r1, r2 and e are as follows: r1=15 mm; r2=5 mm; e=30 mm. These dimensions are especially suitable for classifying bulk material of chunk size 2 (CS 2, cf. example).

Figure 7:
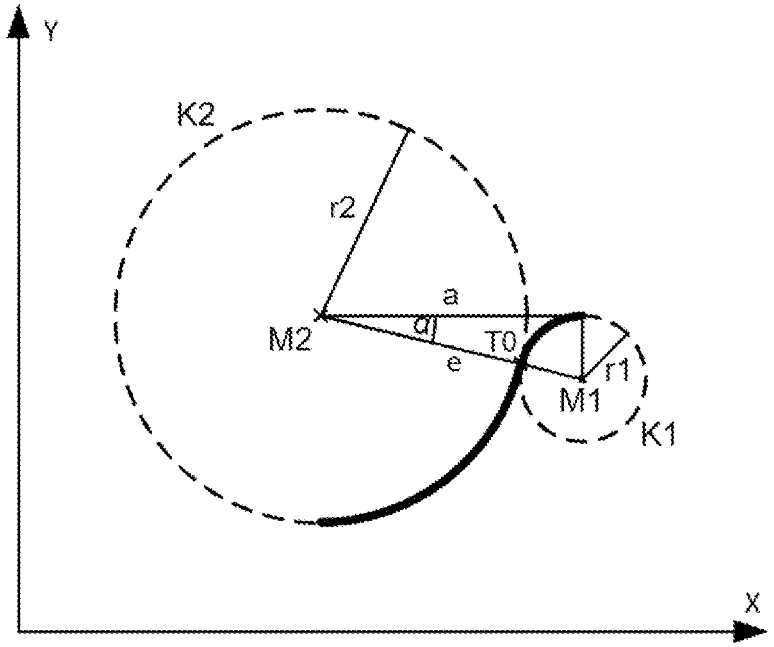
FIG. 7 shows a profile for the removal of oversize.
Figure 8:
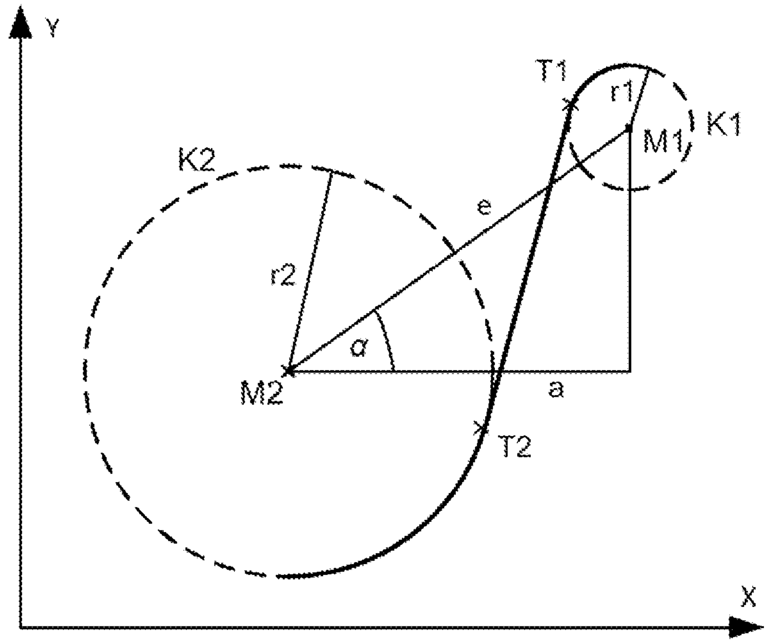
FIG. 8 shows a further profile for the removal of oversize.

FIGS. 7 and 8 each show a profile of the screen plate 10 which is especially suitable for removing oversize. The key difference by comparison with the removal of undersize is that the circle K1 has a smaller radius r1 than the circle K2. Reference may otherwise be made to the observations above. Possible typical values for α, r1, r2 and e are as follows: α=45°; r1=5 mm; r2=25 mm; e=50 mm.

Figure 9:
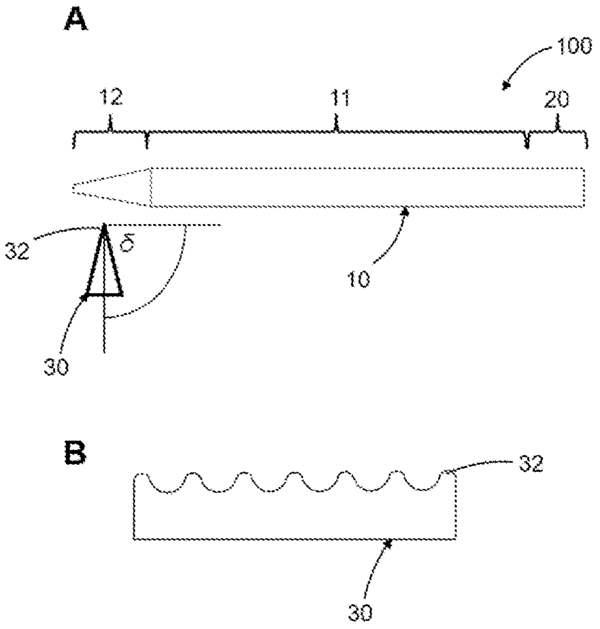
FIG. 9 shows a separating device.

FIG. 9A shows a separating device 100 having a screen plate 10 and a separating element 30 which is disposed beneath the takeoff region 12 and is intended to separate target fraction from oversize or undersize. The separating element 30 has a profiled separating edge 32, with the profiling being apparent in FIG. 9B. The profiling of the separating edge 32 preferably corresponds to the profiling of the screen plate 10. The separating element can be swiveled by an angle δ. On the side of the screen plate 10 opposite the takeoff region 12 there is a charging region 20, which directly adjoins the profile region, but need not necessarily have any profiling. The bulk material is conveyed to the charging region optionally using a conveyor belt (not depicted).

FIG. 10 shows a further embodiment of a separating device 100, which hast wo successive screen plates 10A and 10B. Starting from the left, the first separating element 30A is located after the first screen plate 10A. The separating element 30A can be swiveled by an angle δ. At this point the screen undersize is separated off and collected in the collecting container 40A. The removal of undersize is assisted by a blower 50, which is able to change its effective direction by an angle β. The product fraction is carried further on a second screen plate 10B, where the oversize is separated from the product fraction by means of a second separating element 30B. The product fraction is collected in the collecting container 40B, the oversize in the collecting container 40C. Typical values for the screen plate 10A are as follows: r1=15 mm, r2=5 mm, t=5 mm, and α=15°. The angle δ of the separating element 30A may be 80°. The angle β of the blower 50A may be 30°.

Typical values for the screen plate 10B are as follows: r1=5 mm; r2=25 mm; t=25 mm, e=50 mm; and α=45°. The angle δ of the separating element 30A may be 90°.

FIGS. 11 and 12 each show a further embodiment of the separating device 100. In FIG. 11, two separating elements 30 are disposed directly after a screen plate 10. As a result of this it is possible to separate the oversize fraction (collecting container 40C) and the fines fraction (collecting container 40A) using a screen plate 10 in only one step. FIG. 12 shows a variant similar to that of FIG. 10. In FIG. 12, however, the arrangement is switched round, and first the oversize (collecting container 40C) and subsequently, by means of a second screen plate 10A, the fines (collecting container 40A) are separated off. FIGS. 10 to 12 may be extended or transposed as desired.

EXAMPLE

Undersize Removal

The polysilicon material supplied in a bag by a polysilicon manufacturer may generally include smaller chunks and an undersize fraction (undersize). The undersize, more particularly having particle sizes smaller than 4 mm, has an adverse effect on the pulling operation during the production of monocrystalline silicon, and for that reason must be removed prior to use. For the test, polysilicon of chunk size 2 (CS 2) was used.

The size class of polysilicon chunks is defined as the longest distance between two points on the surface of the silicon chunk (corresponding to the maximum length):

| | |
|---|---|
| CS 0 | 0.1 to 5 mm |
| CS 1 | 3 to 15 mm |
| CS 2 | 10 to 40 mm |
| CS 3 | 20 to 60 mm |
| CS 4 | 45 to 120 mm |
| CS 5 | 100 to 250 mm |

The polysilicon material used for the test (CS 2) was screened using an analytical screen (according to DIN ISO 3310-2) with a nominal hole size W=4 mm (square hole) and was made available for the tests. The undersize fraction removed (undersize) was collected and weighed.

10 kg of the test material (without undersize fraction <4 mm) were applied to a conveying unit. The test material is charged preferably via a hopper. The container to be filled is positioned at the end of the screen section above the first conveying unit, allowing the test material to be readily conveyed into the container.

The undersize fraction separated off in advance is used for this test. Upon filling of the conveying unit, 2 g of undersize fraction is added per 2 kg of test material, resulting in the addition overall of around 10 g of undersize fraction.

The conveying rate was set prior to the test run at 3 kg±0.5 kg per minute. The undersize fraction removed was collected and weighed. The experiments were performed five times per setting.

Test 1:

The conveying unit used comprised a screen plate with a convex opening edge (according to FIGS. 9A and 4A) with t=r2 and a profile according to FIG. 5 with the values of r1=15 mm, r2=5 mm and α=15°. The separating edge of the separating element did not have any profile.

Test 2:

The conveying unit used comprised a screen plate with a rectangular opening edge (according to FIGS. 9A and 4A) with t=r2 and a profile according to FIG. 5 with the values of r1=15 mm, r2=5 mm and α=15°. The separating edge of the separating element did not have any profile.

Test 3:

The conveying unit used comprised a screen plate with a convex opening edge (according to FIGS. 9A and 4A) and a profile according to FIG. 6 with the values of r1=15 mm, r2=5 mm, e=30 mm and α=−15°. The separating edge of the separating element did not have any profile.

Test 4:

The conveying unit used comprised a screen plate with a convex opening edge (according to FIGS. 9A and 4A) and a profile according to FIG. 5 with the values of r1=15 mm, r2=5 mm and α=15°. The separating edge of the separating element had the same profiling as the screen plate. The separating edge here is disposed relative to the profile of the screen plate such that the elevations of the separating edge point to the depressions of the screen plate.

Table 1 shows the average results in comparison to the results from WO 2018/108334 A1.

TABLE 1

| Test | Test material [kg] | Addition of undersize [g] | Undersize removed [g] | Removal rate [%] |
|---|---|---|---|---|
| WO2018/108334 (1) | 10 | 10 | 8.3 | 83 |

TABLE 1-continued

| Test | Test material [kg] | Addition of undersize [g] | Undersize removed [g] | Removal rate [%] |
|---|---|---|---|---|
| 1 | 10 | 10 | 9.5 | 95 |
| 2 | 10 | 10 | 9.0 | 90 |
| 3 | 10 | 10 | 9.2 | 92 |
| 4 | 10 | 10 | 9.6 | 96 |

EXAMPLE

Oversize Removal

The polysilicon material supplied in bags by the polysilicon manufacturer must not contain excessively sized chunks (oversize). The oversize may result in clogging and damage and must therefore be removed prior to use. The test was carried out using CS 2.

All of the oversize chunks were removed manually from the polysilicon material (CS 2) used for the test. The oversize material removed was retained and weighed.

10 kg of the test material without oversize were applied to the conveying unit. Charging took place by a hopper. The container to be filled is positioned at the end of the screening section over the first conveying unit, allowing the test material to be conveyed into the container.

Upon filling of the conveying unit, 100 g of the removed oversize are added per 2 kg of test material, resulting in the overall addition of 500 g of oversize.

The conveying rate was set ahead of the test run at 15 kg±1 kg per minute. The oversize removed was collected and weighed. The tests were performed five times per setting.

Test 1:

The conveying unit used comprised a screen plate with a convex opening edge (according to FIGS. 9A and 4A) with t=r1 and a profile according to FIG. 8 with the values of r1=10 mm, r2=25 mm, e=55 mm and α=45°, and with a separating element without a profile.

Test 2:

A separating device in twofold series was used, according to FIG. 9A, with each of the two screen plates having a convex opening edge with t=r1 (cf. FIG. 4A) and in each case a separating element without a profile. The profile of the screen plates was the product of the following values: r1=10 mm, r2=25 mm, e=55 mm, and α=45°.

Test 3:

A separating device in fourfold series was used, according to FIG. 9A, with each of the four screen plates having a convex opening edge with t=r1 (cf. FIG. 4A) and in each case a separating element without a profile. The profile of the screen plates was the product of the following values: r1=10 mm, r2=25 mm, e=55 mm, and α=45° (cf. FIG. 8).

Test 4:

The conveying unit used comprised a screen plate with a convex opening edge (according to FIGS. 9A and 4A) with t=r1 and a profile according to FIG. 7 with the values of r1=10 mm, r2=25 mm, and α=45°, and with a separating element without a profile.

Table 2 shows the average results for the oversize removal:

TABLE 2

| Test | Test material [kg] | Addition of oversize [g] | Oversize removed [g] | Removal rates [%] |
|---|---|---|---|---|
| 1 | 10 | 500 | 380 | 76 |
| 2 | 10 | 500 | 440 | 88 |
| 3 | 10 | 500 | 500 | 100 |
| 4 | 10 | 500 | 300 | 60 |

The invention claimed is:

1. A screen plate for a separating device for classifying bulk material, comprising:

wherein said screen plate has a profile region which has a profile having depressions and elevations extending in the direction of a takeoff side, wherein the profile is describable by a circle arc of a first circle K1 and by a circle arc of a second circle K2, and the circles K1 and K2 are disposed adjacent to one another, wherein the circle arc of the first circle K1 with a radius r1 describes the elevations and the circle arc of the second circle K2 with a radius r2 describes the depressions, with each depression in a takeoff region undergoing transition into an opening which expands in the direction of the takeoff side, wherein the transition between the depression and the opening is formed by an opening edge with a width corresponding to the length of the radius r2 to 2*r2, characterized in that the profile is subject to $r2 < r1$, with $0 < r2/r1 < 1$;

wherein r1+r2=e or $r1+r2 < e$;

wherein when r1+r2=e, e corresponds to the distance between the circle center point M1 of K1 and the circle center point M2 of K2, and K1 and K2 contact one another at a point T0 at which the circle arcs merge, and wherein $0° < \alpha < 65°$, wherein α is an angle which defines the position of M2 relative to M1 in a cartesian coordinate system if M1 and M2 are vertices of a right-angled triangle and wherein e corresponds to the hypotenuse of the triangle; and wherein when $r1+r2 < e$ and K1 and K2 do not contact one another, where the circle arcs are joined to one another by a common tangent through a point T1 of K1 and a point T2 of K2, and where $-65° < \alpha < 65°$.

2. The screen plate of claim 1, wherein when r1+r2=e, the angle α is subject to $0° < \alpha < 25°$, preferably $5° < \alpha < 20°$.

3. The screen plate of claim 1, wherein when $r1+r2 < e$, the angle α is subject to $-25° < \alpha < 10°$, preferably $-10° < \alpha < 5°$.

4. The screen plate of claim 1, wherein r2/r1 is subject to $0.2 < r2/r1 < 0.4$.

5. The screen plate of claim 1, wherein the opening edge has a concave extent and has a depth t for which $0 < t \leq 5*r2$, preferably r2 to 5*r2, more preferably r2 to 4*r2, more particularly 2*r2 to 3*r2.

6. The screen plate of claim 1, wherein the opening edge has a rectangular extent and has a depth t for which $0 < t \leq 5*r2$, preferably r2 to 5*r2, more preferably r2 to 4*r2, more particularly 2*r2 to 3*r2.

7. A screen plate for a separating device for classifying bulk material, comprising:

wherein the screen plate has a profile region which has a profile having depressions and elevations extending in the direction of a takeoff side, wherein the profile is describable by a circle arc of a first circle K1 and by a circle arc of a second circle K2, and the circles K1 and K2 are disposed adjacent to one another, wherein the circle arc of the first circle K1 with a radius r1 describes the elevations and the circle arc of the second circle K2 with a radius $r2$ describes the depressions, with each depression in a takeoff region undergoing transition into an opening which expands in the direction of the takeoff side, wherein the transition between the depression and the opening is formed by an opening edge with a width corresponding to the length of the radius $r2$ to $2*r2$;

wherein the profile is subject to $r2>r1$, with $0<r1/r2<1$, and wherein either $r1+r2=e$ or $r1+r2<e$;

wherein when $r1+r2=e$, e corresponds to the distance between the circle center point M1 of K1 and the circle center point M2 of K2, and K1 and K2 contact one another at a point T0 at which the circle arcs merge and where $-65°<\alpha<0°$, wherein $\alpha$ is an angle which defines the position of M2 relative to M1 in a cartesian coordinate system, if M1 and M2 are vertices of a right-angled triangle and e corresponds to the hypotenuse; and wherein when $r1+r2<e$ and K1 and K2 do not contact one another, where the circle arcs are joined to one another by a common tangent through a point T1 of K1 and a point T2 of K2, and where $-65°<\alpha<65°$.

8. The screen plate of claim 7, wherein $r1/r2$ is subject to $0.2<r1/r2<0.4$.

9. The screen plate of claim 7, wherein the angle $\alpha$ is subject to $-20°<\alpha<0°$.

10. The screen plate of claim 7, wherein the opening edge has a concave extent and has a depth t for which $0<t\leq 5*r2$, preferably $r2$ to $5*r2$, more preferably $r2$ to $4*r2$, more particularly $2*r2$ to $3*r2$.

11. The screen plate of claim 7, wherein the opening edge has a rectangular extent and has a depth t for which $0<t\leq 5*r2$, preferably $r2$ to $5*r2$, more preferably $r2$ to $4*r2$, more particularly $2*r2$ to $3*r2$.

12. A separating device for classifying bulk material, comprising:

at least one screen plate and at least one separating element;

wherein the at least one screen plate has a profile region which has a profile having depressions and elevations extending in the direction of a takeoff side, wherein the profile is describable by a circle arc of a first circle K1 and by a circle arc of a second circle K2, and the circles K1 and K2 are disposed adjacent to one another, wherein the circle arc of the first circle K1 with a radius $r1$ describes the elevations and the circle arc of the second circle K2 with a radius $r2$ describes the depressions, with each depression in a takeoff region undergoing transition into an opening which expands in the direction of the takeoff side, wherein the transition between the depression and the opening is formed by an opening edge with a width corresponding to the length of the radius $r2$ to $2*r2$, characterized in that the profile is subject to $r2<r1$, with $0<r2/r1<1$;

wherein $r1+r2=e$ or $r1+r2<e$;

wherein when $r1+r2=e$, e corresponds to the distance between the circle center point M1 of K1 and the circle center point M2 of K2, and K1 and K2 contact one another at a point T0 at which the circle arcs merge, and wherein $0°<\alpha<65°$, wherein $\alpha$ is an angle which defines the position of M2 relative to M1 in a cartesian coordinate system if M1 and M2 are vertices of a right-angled triangle and wherein e corresponds to the hypotenuse of the triangle; and wherein when $r1+r2<e$ and K1 and K2 do not contact one another, where the circle arcs are joined to one another by a common tangent through a point T1 of K1 and a point T2 of K2, and where $-65°<\alpha<65°$;

wherein the at least one separating element is disposed beneath the takeoff region of the at least one screen plate and has a separating edge; and wherein the separating edge of the at least one separating element has a profile like the at least one screen plate.

13. The separating device of claim 12, wherein the separating element is swivelable by an angle $\delta$.

14. A separating device for classifying bulk material, comprising:

at least one screen plate and at least one separating element;

wherein the screen plate has a profile region which has a profile having depressions and elevations extending in the direction of a takeoff side, wherein the profile is describable by a circle arc of a first circle K1 and by a circle arc of a second circle K2, and the circles K1 and K2 are disposed adjacent to one another, wherein the circle arc of the first circle K1 with a radius $r1$ describes the elevations and the circle arc of the second circle K2 with a radius $r2$ describes the depressions, with each depression in a takeoff region undergoing transition into an opening which expands in the direction of the takeoff side, wherein the transition between the depression and the opening is formed by an opening edge with a width corresponding to the length of the radius $r2$ to $2*r2$;

wherein the profile is subject to $r2>r1$, with $0<r1/r2<1$, and wherein either $r1+r2=e$ or $r1+r2<e$;

wherein when $r1+r2=e$, e corresponds to the distance between the circle center point M1 of K1 and the circle center point M2 of K2, and K1 and K2 contact one another at a point T0 at which the circle arcs merge and where $-65°<\alpha<0°$, wherein $\alpha$ is an angle which defines the position of M2 relative to M1 in a cartesian coordinate system, if M1 and M2 are vertices of a right-angled triangle and e corresponds to the hypotenuse; and wherein when $r1+r2<e$ and K1 and K2 do not contact one another, where the circle arcs are joined to one another by a common tangent through a point T1 of K1 and a point T2 of K2, and where $-65°<\alpha<65°$;

wherein the at least one separating element is disposed beneath the takeoff region of the at least one screen plate and has a separating edge; and wherein the separating edge of the at least one separating element has a profile like the at least one screen plate.

15. The separating device of claim 14, wherein the separating element is swivelable by an angle $\delta$.

* * * * *